(12) United States Patent
Gupta

(10) Patent No.: US 11,005,948 B1
(45) Date of Patent: May 11, 2021

(54) WEB CONTENT TRANSFER UTILIZING MESSAGES OF MESSAGING PROTOCOL OF CELLULAR VOICE NETWORK

(71) Applicant: EMC IP Holding Company LLC, Hopkinton, MA (US)

(72) Inventor: Shubham Gupta, Jaipur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/730,153

(22) Filed: Dec. 30, 2019

(51) Int. Cl.
G06F 13/00 (2006.01)
H04L 29/08 (2006.01)
H04W 24/08 (2009.01)

(52) U.S. Cl.
CPC ............ H04L 67/147 (2013.01); H04L 67/02 (2013.01); H04L 67/04 (2013.01); H04W 24/08 (2013.01)

(58) Field of Classification Search
CPC ....... H04L 67/147; H04L 67/02; H04L 67/04; H04W 24/08
USPC ................................. 709/224, 230, 227, 228
See application file for complete search history.

(56) References Cited

U.S. PATENT DOCUMENTS

| | | | | |
|---|---|---|---|---|
| 8,019,365 B2* | 9/2011 | Fisher | .................... | G06Q 20/40 455/466 |
| 8,478,310 B2* | 7/2013 | Reding | .................... | H04W 4/14 455/466 |
| 9,641,661 B2* | 5/2017 | Chen | .................... | H04M 1/72403 |
| 2008/0051122 A1* | 2/2008 | Fisher | .................... | G06Q 20/20 455/466 |
| 2008/0085728 A1 | 4/2008 | Reding et al. | | |
| 2009/0161633 A1* | 6/2009 | Chen | .................... | H04M 1/72403 370/335 |
| 2018/0007049 A1* | 1/2018 | Palki | .................... | H04L 63/08 |
| 2018/0268359 A1* | 9/2018 | Soubhagya | ........ | G08G 1/096741 |

OTHER PUBLICATIONS

B. Petrovan, "Cosmos, the No-Data Connection Web Browser, Is Now in the US Play Store," Android Authority, https://www.androidauthority.com/cosmos-browser-play-store-531334/, Sep. 29, 2014, 25 pages.

(Continued)

Primary Examiner — Kenneth R Coulter
(74) Attorney, Agent, or Firm — Ryan, Mason & Lewis, LLP

(57) ABSTRACT

An apparatus includes at least one processing device including a processor coupled to a memory. The at least one processing device is configured to perform the step of monitoring a level of connectivity, of the at least one processing device, for one or more wireless data networks. The at least one processing device is also configured to perform the step of, responsive to determining that the monitored level of connectivity is at or below a designated threshold level of connectivity, utilizing a messaging protocol of one or more cellular voice networks to transfer web content. The at least one processing device is further configured to perform the step of, responsive to determining that the monitored level of connectivity is above the designated threshold level of connectivity, utilizing the one or more wireless data networks to transfer the web content.

20 Claims, 7 Drawing Sheets

(56) References Cited

OTHER PUBLICATIONS

NDTV Correspondent, "Cosmos Browser Will Let You Surf the Web via SMS," Gadgets 360, https://gadgets.ndtv.com/apps/news/cosmos-browser-will-let-you-surf-the-web-via-sms-593270, Sep. 17, 2014, 6 pages.
S. Anthony, "How to Surf T-Mobile without a Data Plan," Extreme Tech, https://www.extremetech.com/computing/95457-how-to-surf-t-mobile-without-a-data-plan, Sep. 9, 2011, 3 pages.
D. Thomas, "No Data, No Problem—Use SMS to Connect to Your Favorite Web Services on Android," Gadget Hacks, https://android.gadgethacks.com/how-to/no-data-no-problem-use-sms-connect-your-favorite-web-services-android-0161528/, Apr. 24, 2015, 9 pages.

* cited by examiner

US 11,005,948 B1

WEB CONTENT TRANSFER UTILIZING MESSAGES OF MESSAGING PROTOCOL OF CELLULAR VOICE NETWORK

FIELD

The present invention relates generally to the field of information processing, and more particularly to techniques for providing content in information processing systems.

BACKGROUND

Smartphones and other types of mobile computing devices run mobile applications that provide various functionality for users of the mobile computing devices. To provide such functionality, many mobile applications require a connection to the Internet via one or more wireless data networks to transfer web content. When connectivity on the wireless data networks is poor or low, the functionality of the mobile applications may be affected as real time data or web content is not able to be sent from the mobile devices or received at the mobile devices. There is thus a need for techniques which enable the transfer of web content or other data when mobile devices experience poor or low connectivity on wireless data networks.

SUMMARY

Illustrative embodiments of the present disclosure provide techniques for transferring web content utilizing a messaging protocol of one or more cellular voice networks.

In one embodiment, an apparatus comprises at least one processing device comprising a processor coupled to a memory, the at least one processing device is configured to perform the step of monitoring a level of connectivity, of the at least one processing device, for one or more wireless data networks. The at least one processing device is also configured to perform the step of, responsive to determining that the monitored level of connectivity is at or below a designated threshold level of connectivity, utilizing a messaging protocol of one or more cellular voice networks to transfer web content. The at least one processing device is further configured to perform the step of, responsive to determining that the monitored level of connectivity is above the designated threshold level of connectivity, utilizing the one or more wireless data networks to transfer the web content.

In another embodiment, an apparatus comprises at least one processing device comprising a processor coupled to a memory, the at least one processing device being configured to perform steps of receiving, from one or more web servers, web content that is to be sent to a client device having a level of connectivity for one or more wireless data networks that is at or below a designated threshold level of connectivity, converting the web content to one or more messages of a messaging protocol of one or more cellular voice networks, and sending, to the client device, the one or more messages using the messaging protocol of the one or more cellular voice networks.

These and other illustrative embodiments include, without limitation, methods, apparatus, networks, systems and processor-readable storage media.

DETAILED DESCRIPTION

Figure 1:
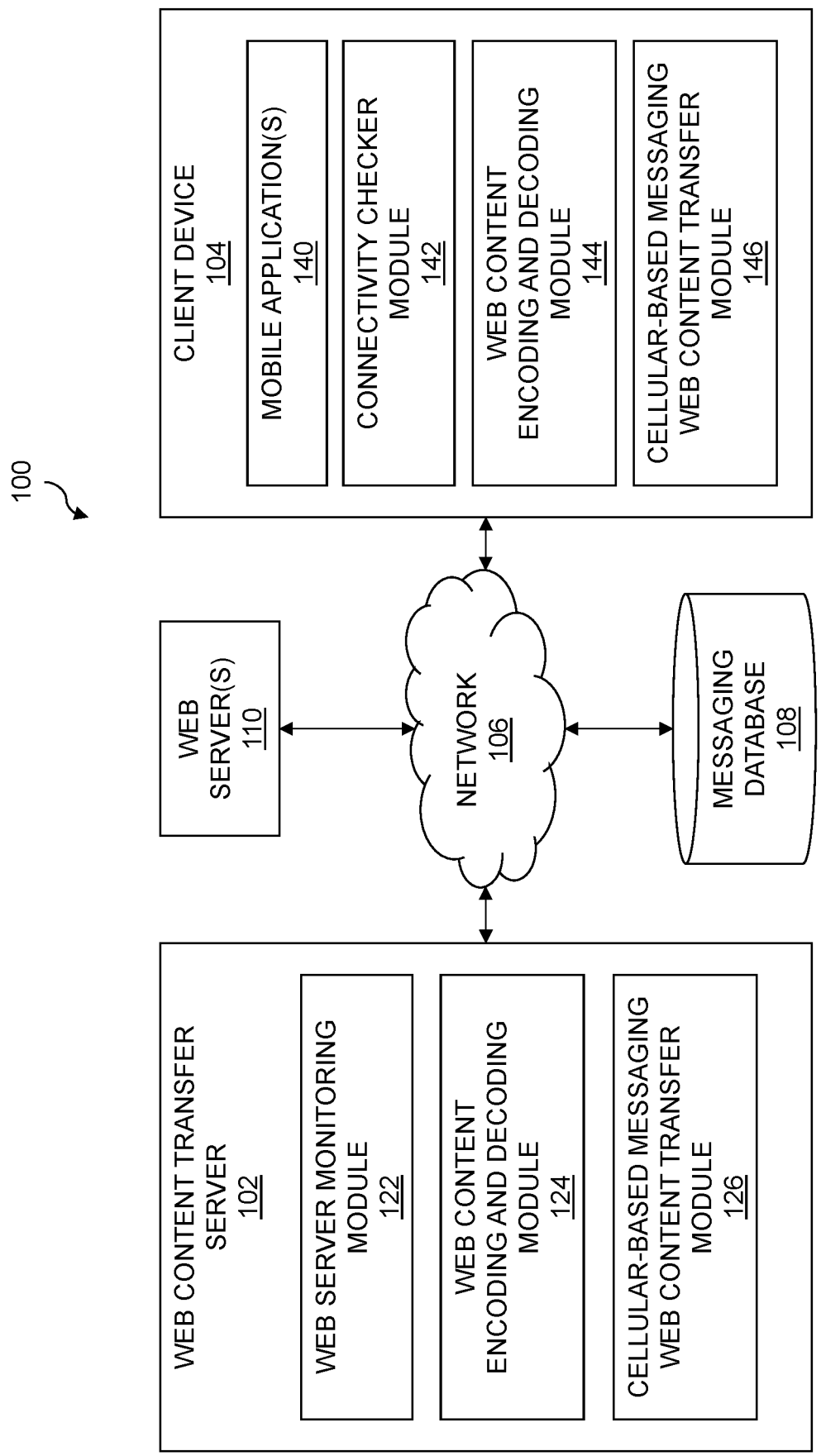
FIG. 1 is a block diagram of an information processing system for transferring web content utilizing a messaging protocol of one or more cellular voice networks in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources FIG. 1 shows an information processing system 100 configured in accordance with an illustrative embodiment. The information processing system 100 is assumed to be built on at least one processing platform and provides functionality for transferring web content utilizing one or more messages of a messaging protocol of one or more cellular voice networks. The messaging protocol may comprise the short message system (SMS) protocol. In other embodiments, messages of the multimedia messaging service (MMS) protocol may be used or combinations of SMS and MMS messages may be used. In illustrative embodiments, a web content transfer server 102 is configured to provide web content to a client device 104 using messages of the messaging protocol of the one or more cellular voice networks when the client device 104 is experiencing low or poor connectivity (e.g., a level of connectivity that is at or below some designated threshold level of connectivity) to one or more wireless data networks.

As shown in FIG. 1, the information processing system 100 includes the web content transfer server 102 and the client device 104 coupled via a network 106. Also coupled to the network 106 are a messaging database 108 and one or more web servers 110. The web servers 110 are assumed to be the destination for web content requests from mobile applications 140 running on the client device 104, and are further assumed to be the source of web content included in responses to the web content requests. In some cases, for example, the mobile applications 140 may comprise web applications that are implemented as client-server computer programs in which the client runs in a web browser on the client device 104 and the web servers 110 host the web application. It should be appreciated, however, that the mobile applications 140 need not be web applications, but may instead be any type of application or software (including an operating system of the client device 104) that consumes web content (e.g., obtained from the Internet).

Although FIG. 1 shows only a single instance of the web content transfer server 102 and client device 104, it should be appreciated that in other embodiments multiple instances of these elements may be present. In some embodiments, the web content transfer server 102 may be configured to provide web content to a plurality of different client devices utilizing messages of the messaging protocol of the cellular voice networks. The plurality of different client devices may be associated with a particular company, organization or other enterprise. The plurality of different client devices may also or alternatively comprise client devices that sign up for services offered by the web content transfer server 102. Further, a single client device such as client device 104 may interact with or utilize different instances of a web content transfer server. For example, each instance of the web content transfer server may be used for a different one of a set of the mobile applications 140 running on the client device 104.

The client device 104 is assumed to comprise a computing device that is capable of experiencing varying levels of connectivity to one or more wireless data networks, and that is capable of utilizing the messaging protocol of the cellular voice networks. For example, the client device 104 may comprise a smartphone or other mobile telephone, a laptop computing device, a tablet computing device, a smartwatch or other wearable computing device, an Internet of Things (IoT) device, etc. Such devices are examples of what are more generally referred to herein as "processing devices." Some of these processing devices are also generally referred to herein as "computers." The client device 104 may also or alternately comprise or utilize virtualized computing resources, such as virtual machines (VMs), software containers, etc. In various embodiments described below, it is assumed that the client device 104 comprises a smartphone, but it should be appreciated that the client device 104 may more generally include any computing device of the type described above.

The client device 104 (and other client devices not shown in FIG. 1 configured to utilize the web content transfer server 102 to transfer web content while experiencing low or poor connectivity to one or more wireless data networks) may comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 represents a combination of various types of networks, including a global computer network such as the Internet, one or more wireless data networks (e.g., 3G, 4G and 5G cellular data networks, WiFi or WiMAX networks, etc.), one or more cellular voice networks, etc. The network 106 may further or alternatively include a wide area network (WAN), a local area network (LAN), a satellite network, a telephone or cable network, or various portions or combinations of these and other types of networks.

The messaging database 108 may store various information that is utilized by the web content transfer server 102 and/or the client device 104 to enable web content transfer utilizing messages of the messaging protocol of the cellular voice networks. For example, the messaging database 108 may store address information such that the client device 104 can route the messages of the messaging protocol of the cellular voice networks to the web content transfer server 102. The messaging database 108 may further or alternatively store address information or other identifiers of client devices that are authorized to utilize the web content transfer server 102 for web content transfer utilizing messages of the messaging protocol of the cellular voice networks.

The messaging database 108 may also store messages of the messaging protocol of the cellular voice networks that are sent/received between the web content transfer server 102 and client device 104. For example, the client device 104 in some instances may be out of range or unable to connect to the cellular voice networks to receive messages of the messaging protocol of the cellular voice networks. In such cases, the web content transfer server 102 may store messages comprising web content to be transferred to the client device 104 when the client device 104 is later able to connect to the cellular voice networks to receive such messages. The web content transfer server 102 may periodically retry sending of the messages that are stored in the messaging database 108.

Although shown as being implemented external to both the web content transfer server 102 and client device 104 in FIG. 1, it should be appreciated that in some embodiments the messaging database 108 may be implemented at least partially internal to the web content transfer server 102 or the client device 104. The messaging database 108 may comprise or utilize any type of database or other data store configured to store the information described above and elsewhere herein.

The messaging database 108 in some embodiments is implemented using one or more storage systems or devices associated with the web content transfer server 102. In some embodiments, one or more of the storage systems utilized to implement the messaging database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the web content transfer server 102, as well as to support communication between the web content transfer server 102 and other related systems and devices not explicitly shown.

The client device 104 may implement a host agent or one or more application programming interfaces (APIs) configured to interact with a corresponding host agent or one or more APIs of the web content transfer server 102. For example the host agent or APIs on the client device 104 may run in web browsers or as part of other software or services on the client device 104 so that when a user of the client device 104 makes a web content request while the client device 104 is experiencing low or poor connectivity, the web content request can be sent utilizing a reduced payload content length and/or utilizing messages of the messaging protocol of the cellular voice networks. Similarly, the host agent or APIs on the client device 104 may be configured to receive web content that is obtained from received messages of the messaging protocol of the cellular voice networks. The host agent or APIs on the client device 104 may further be configured to display notifications to the user of the client device 104 when the client device 104 is experiencing low or poor connectivity and web content transfer is taking place utilizing messages of the messaging protocol of the cellular voice networks. It should be noted that a "host agent" as this term is generally used herein may comprise an automated entity, such as a software entity running on a processing device. Accordingly, a host agent need not be a human entity.

The web content transfer server 102 and client device 104 in the FIG. 1 embodiment are each assumed to be implemented using at least one processing device. Each such processing device generally comprises at least one processor and an associated memory, and implements one or more functional modules for controlling certain features of the web content transfer server 102 and client device 104. For the web content transfer server 102, such functional modules include a web server monitoring module 122, a web content encoding and decoding module 124, and a cellular-based messaging web content transfer module 126. For the client device 104, such functional modules include a connectivity checker module 142, a web content encoding and decoding module 144, and cellular-based messaging web content transfer module 146.

The web server monitoring module 122 is configured to implement an API that monitors the web server 110 for web content that is to be transferred to the client device 104 having a level of connectivity for one or more wireless data networks that is at or below a designated threshold level of connectivity. In such cases, the web content transfer server 102 will receive the web content to be transferred on behalf of the client device 104. The web content encoding and decoding module 124 converts the web content to one or more messages of a messaging protocol of one or more cellular voice networks. The cellular-based messaging web content transfer module 126 sends, to the client device 104, the one or more messages using the messaging protocol of the one or more cellular voice networks. The cellular-based messaging web content transfer module 126 may also receive one or more additional messages of the messaging protocol of the one or more cellular voice networks from the client device 104. The web content encoding and decoding module 124 may convert such additional messages to additional web content that is to be transferred to the web servers 110, and the web server monitoring module 122 may transfer such additional web content to the web servers 110 on behalf of the client device 104.

The connectivity checker module 142 is configured to monitor a level of connectivity, of the client device 104, for one or more wireless data networks. Responsive to determining that the monitored level of connectivity is at or below a designated threshold level of connectivity, the client device 104 is configured to utilize the web content encoding and decoding module 144 and cellular-based messaging web content transfer module 146 to utilize a messaging protocol of one or more cellular voice networks to transfer web content. More particularly, the web content encoding and decoding module 144 is configured to convert web requests (e.g., from one or more of the mobile applications 140) into messages of the messaging protocol of the one or more cellular voice networks and the cellular-based messaging web content transfer module 146 sends such messages to the web content transfer server 102. The cellular-based messaging web content transfer module 146 is also configured to receive messages of the messaging protocol of the one or more cellular voice networks from the web content transfer server 102, and the web content encoding and decoding module 144 converts such messages into web responses and associated content (e.g., for use in one or more of the mobile applications 140). Responsive to determining that the monitored level of connectivity is above the designated threshold level of connectivity, the client device 104 is configured to utilize the one or more wireless data networks to transfer the web content.

At least portions of the web server monitoring module 122, the web content encoding and decoding module 124, the cellular-based messaging web content transfer module 126, the connectivity checker module 142, the web content encoding and decoding module 144, and the cellular-based messaging web content transfer module 146 may be implemented at least in part in the form of software that is stored in memory and executed by a processor.

It is to be appreciated that the particular arrangement of the web content transfer server 102, client device 104, messaging database 108 and web servers 110 illustrated in the FIG. 1 embodiment is presented by way of example only, and alternative arrangements can be used in other embodiments. In some embodiments, for example, there may be multiple instances of the web content transfer server 102 or there may be multiple different client devices. As another example, the functionality associated with the web server monitoring module 122, the web content encoding and decoding module 124, the cellular-based messaging web content transfer module 126, the connectivity checker module 142, the web content encoding and decoding module 144, and the cellular-based messaging web content transfer module 146 may be combined into fewer modules, or separated across more modules with the multiple modules possibly being implemented with multiple distinct processors or processing devices.

It is to be understood that the particular set of elements shown in FIG. 1 for transferring web content utilizing one or more messages of a messaging protocol of one or more cellular voice networks is presented by way of illustrative example only, and in other embodiments additional or alternative elements may be used. Thus, another embodiment may include additional or alternative systems, devices and other network entities, as well as different arrangements of modules and other components.

The web content transfer server 102, in some embodiments, is part of cloud infrastructure as will be described in further detail below. The cloud infrastructure hosting the web content transfer server 102 may also host other elements of the information processing system 100, such as the messaging database 108 and web servers 110.

The web content transfer server 102, client device 104 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The web content transfer server 102, client device 104, messaging database 108 and web servers 110 or components thereof may be implemented on respective distinct processing platforms, although numerous other arrangements are possible. For example, in some embodiments at least portions of the web content transfer server 102 and web servers 110 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the web content transfer server 102, client device 104, messaging database 108 and web servers 110, or portions or components thereof, to reside in different data centers. Numerous other distributed implementations are possible. The web content transfer server 102 or portions thereof can also be implemented in a distributed manner across multiple data centers.

Additional examples of processing platforms utilized to implement the web content transfer server 102, client device 104 and other portions of the system 100 in illustrative embodiments will be described in more detail below in conjunction with FIGS. 5 and 6.

It is to be appreciated that these and other features of illustrative embodiments are presented by way of example only, and should not be construed as limiting in any way. Exemplary processes for transferring web content utilizing one or more messages of a messaging protocol of one or more cellular voice networks will now be described in more detail with reference to the flow diagrams of FIGS. 2 and 3. It is to be understood that these particular processes are only examples, and that additional or alternative processes for transferring web content utilizing one or more messages of a messaging protocol of one or more cellular voice networks may be used in other embodiments.

Figure 2:
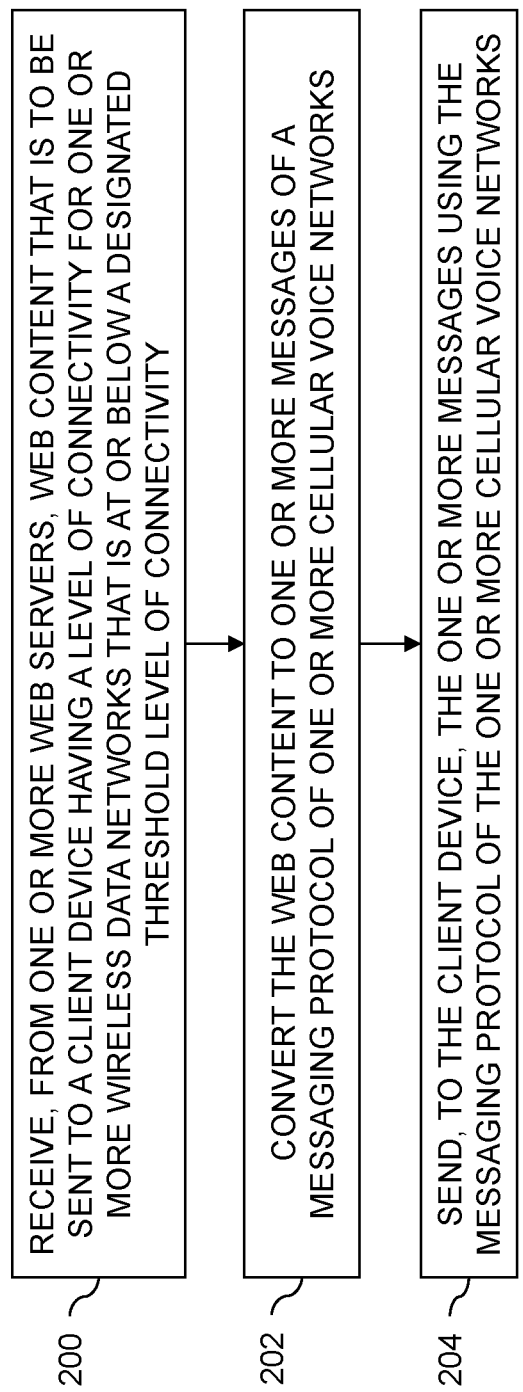
FIG. 2 is a flow diagram of an exemplary process for transferring web content utilizing one or more messages of a messaging protocol of one or more cellular voice networks in an illustrative embodiment.

In the FIG. 2 embodiment, the process includes steps 200 through 204. These steps are assumed to be performed by the web content transfer server 102 utilizing the web server monitoring module 122, the web content encoding and decoding module 124, and the cellular-based messaging web content transfer module 126.

In step 200, web content is received from one or more web servers (e.g., web servers 110), where the web content is to be sent to a client device (e.g., client device 104) having a level of connectivity for one or more wireless data networks that is at or below a designated threshold level of connectivity. The web content is converted, in step 202, to one or more messages of a messaging protocol of one or more cellular voice networks (e.g., SMS messages). In some embodiments, the messages (e.g., SMS messages) have a length limit and thus the web content may not be able to transmitted utilizing a single message. In such cases, the web content may be sent using multiple messages, where the messages include headers or other identifiers indicating that that the web content is spread across the multiple messages so that the multiple messages may be combined into the web content at the client device. In a similar manner, web content from the client device may be sent using multiple messages.

The one or more messages are sent to the client device in step 204 using the messaging protocol of the one or more cellular voice networks. Step 202 may include at least one of encrypting, serializing and compressing the web content. The FIG. 2 process may further include receiving, from the client device, one or more additional messages of the messaging protocol of the one or more cellular voice networks, converting the one or more additional messages of the messages to additional web content, and sending, to the one or more web servers, the additional web content.

Figure 3:
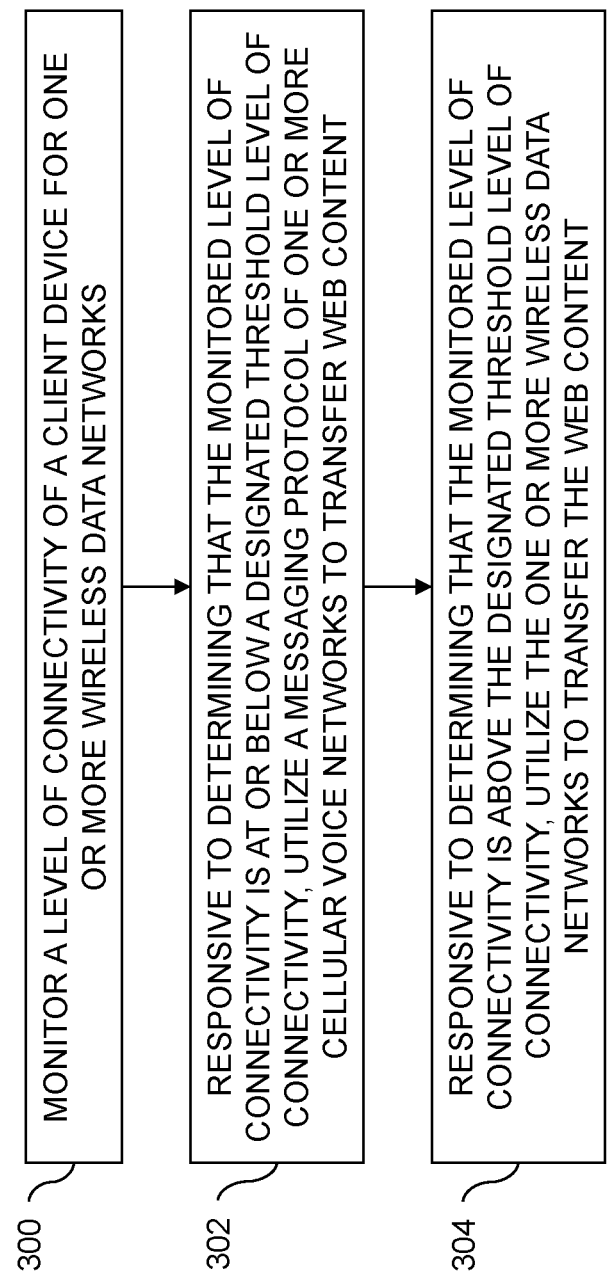
FIG. 3 is another flow diagram of an exemplary process for transferring web content utilizing one or more messages of a messaging protocol of one or more cellular voice networks in an illustrative embodiment.

In the FIG. 3 embodiment, the process includes steps 300 through 304. These steps are assumed to be performed by the client device 104 utilizing the connectivity checker module 142, the web content encoding and decoding module 144, and the cellular-based messaging web content transfer module 146.

In step 300, a level of connectivity of a client device (e.g., client device 104), for one or more wireless data networks is monitored. Responsive to determining that the monitored level of connectivity is at or below a designated threshold level of connectivity, a messaging protocol of one or more cellular voice networks is utilized to transfer web content in step 302. Responsive to determining that the monitored level of connectivity is above the designated threshold level of connectivity, the one or more wireless data networks are utilized to transfer the web content in step 304.

The one or more wireless data networks may comprise at least one of a 3G cellular data network, a 4G cellular data network, a 5G cellular data network, and a WiFi data network. The messaging protocol of the one or more cellular voice networks may comprise the SMS protocol. The designated threshold level of connectivity may correspond to a designated available data transfer speed over the one or more wireless data networks. The designated available data transfer speed may comprise a data transfer speed associated with 2G cellular data networks.

Step 302 may include, for incoming web content, intercepting one or more incoming messages of the messaging protocol of the one or more cellular voice networks that have a source address corresponding to one or more designated addresses of a service (e.g., web content transfer server 102) for transferring the web data over the messaging protocol of the one or more cellular voice networks, converting the one or more incoming messages to the incoming web content, and providing the incoming web content to one or more associated data applications running on the client device. Intercepting the one or more incoming messages comprises automatically preventing at least one of: display of the one or more incoming messages in one or more messaging applications running on the client device; and display of notifications associated with the one or more incoming messages in a user interface running on the client device. Portions of the one or more incoming messages may be at least one of encrypted, serialized and compressed, and converting the one or more incoming messages to the incoming web data may comprise at least one of decrypting portions of the one or more incoming messages that are encrypted, deserializing portions of the one or more incoming messages that are serialized, and decompressing portions of the one or more incoming messages that are compressed.

Step 302 may include, for outgoing web content, intercepting one or more outgoing data requests associated with one or more data applications running on the client device, converting the one or more outgoing data requests to one or more outgoing messages of the messaging protocol of the one or more cellular voice networks, and providing the one or more outgoing messages to one or more designated addresses corresponding to a service (e.g., web content transfer server 102) for transferring the web data over the messaging protocol of the one or more cellular voice networks. Converting the one or more outgoing data requests to the one or more outgoing messages of the messaging protocol of the one or more cellular voice networks comprises at least one of encrypting at least a portion of the one or more outgoing data requests, serializing at least a portion of the one or more outgoing data requests, and compressing at least a portion of the one or more outgoing data requests.

The FIG. 3 process may further include, responsive to determining that the monitored level of connectivity is at or below the designated threshold level of connectivity and greater than another designated threshold level of connectivity, utilizing 304 the one or more wireless data networks to send outgoing web content from the client device and utilizing the messaging protocol of the one or more cellular voice networks to receive incoming web content at the client device. Sending the outgoing web data may comprise reducing a payload content length of one or more outgoing data requests prior to sending the one or more outgoing data requests over the one or more wireless data networks.

The FIG. 3 process may further include providing an indicator that web content is being transferred over the messaging protocol of the one or more cellular voice networks responsive to utilizing the messaging protocol of the one or more cellular voice networks to transfer the web content.

Today, smartphones and other types of mobile computing devices are ubiquitous. Such mobile devices are configured to run various mobile applications (e.g., web applications, native applications, hybrid applications, etc.) that enable and empower users of the mobile computing devices to perform various tasks. Such mobile applications can be used to increase productivity, stay connected with other users, etc. To provide such functionality, mobile applications utilize increasing amounts of data (e.g., web content that is transferred to and from the mobile devices) and rely on mobile devices with advanced chipsets that can access or utilize fast data connections such as those associated with 4G and 5G cellular networks, advanced WiFi such as WiFi version 6, etc. As a result, mobile applications tend to function best when there is a fast cellular data connection or WiFi network available. In other words, mobile applications rely on fast and strong connectivity on one or more wireless data networks.

Poor or low connectivity on wireless data networks can result in poor user experience. Mobile applications running on devices experiencing poor or low connectivity can be frustrating for users, and some users may choose to delete or limit use of such mobile applications. Various techniques may be used by mobile applications to account for poor or low connectivity on wireless data networks. One such technique is designing a mobile application to function in an "offline" mode. A mobile application in an offline mode can make use of local storage of the mobile device on which it runs to cache data that enables some functionality of the mobile application. Various caching strategies may be used to provide desired performance for users of the offline mode mobile applications. Using the cached data on the mobile device, the mobile application running in the offline mode enables the user to view the cached data. Such an approach, however, does not enable the user to perform real time actions that require connectivity on the wireless data networks. In the context of a mobile application for sales (also referred to herein as a sales application), while in offline mode the sales application may not allow users to create orders, edit opportunities, or search for details while engaging with a customer to make a sale.

Another technique is to create a "lite" version of the mobile application, where the lite versioned mobile application provides a pared-down version of the mobile application that is optimized for poor or low connectivity by retaining the mobile application's core functionality and behavior. A lite versioned mobile application, for example, may cut down on the use of graphics and other content. Such an approach, however, compromises functionality and also fails to work when there is no wireless data network connectivity.

When a mobile device is experiencing poor or low connectivity on wireless data networks, some mobile applications (e.g., native applications) are able to render a proper user interface (UI), but functionalities which require connectivity on the wireless data networks may be completely blocked (e.g., possibly alongside display of a message indicating that the Internet or other connection is not available). Other mobile applications may block functionality altogether when the mobile device is experiencing poor or low connectivity on the wireless data networks, and display error messages to the user.

Various types of mobile applications may benefit from access to real time data when an associated mobile device is experiencing poor or low connectivity on wireless data networks. Consider, as an example, a sales application designed for use by sales representatives, their managers and other personnel of an enterprise to increase their productivity on the go. The sales application may provide functionality for creating, editing and viewing orders, accounts, opportunities, trip reports, etc. Such functionality equips sales representatives with the ability to perform a variety of tasks from mobile devices (e.g., from a smartphone) while the sales representatives are on location with customers. If the sales application becomes unresponsive, lags or hangs when a mobile device is experiencing poor or low connectivity on wireless data networks, this can disrupt or lead to lost deals (e.g., without real time data, the sales representative or customer may not be able to evaluate a prospective deal or other transaction, complete a deal or other transaction, etc.).

Illustrative embodiments provide techniques for determining when mobile devices are experiencing poor or low connectivity on wireless data networks, and for making real time data available while the mobile devices are experiencing poor or low connectivity on the wireless data networks. To do so, some embodiments utilizing a messaging protocol of a cellular voice network, such as the SMS protocol, to enable transfer of web content for mobile devices experiencing poor or low connectivity on the wireless data networks (e.g., a level of connectivity for one or more wireless data networks that is at or below a designated threshold level of connectivity).

In some embodiments, communication channels are created to and from APIs on a mobile device (e.g., client device 104) and a service (e.g., web content transfer server 102) that utilize messages of the messaging protocol to transfer web content. There may be one or more APIs that run on the mobile device, as well as one or more APIs that run on the service (e.g., as one or more microservices) in a server that enables transfer of web content when the mobile devices are experiencing poor or low connectivity on wireless data networks. As a result, mobile applications are able to more effectively and continuously provide functionality to users thereof.

Figure 4A:
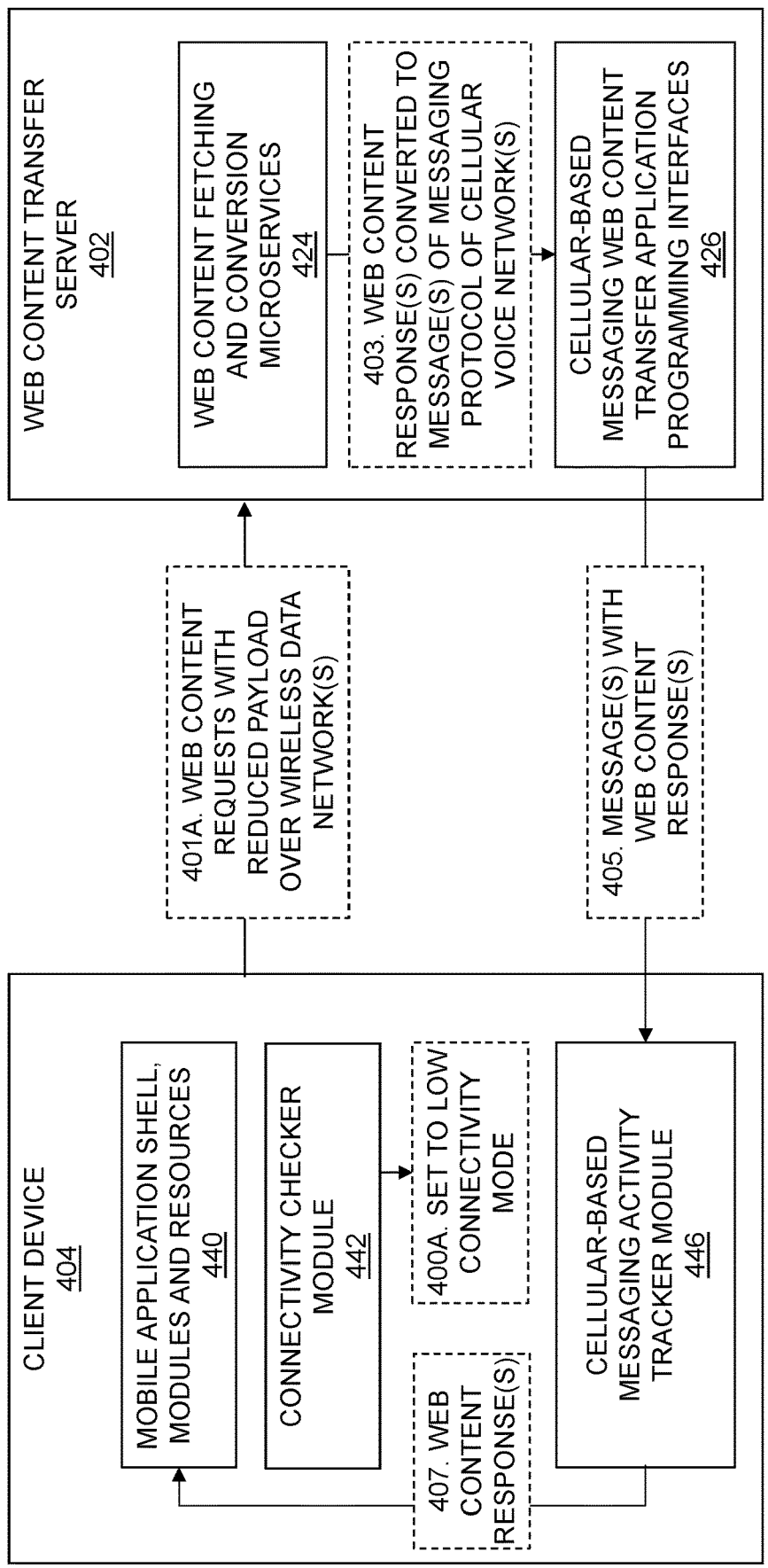
FIGS. 4A and 4B show a system flow for transferring web content utilizing one or more messages of a messaging protocol of one or more cellular voice networks in low connectivity and offline modes in an illustrative embodiment.
Figure 4B:
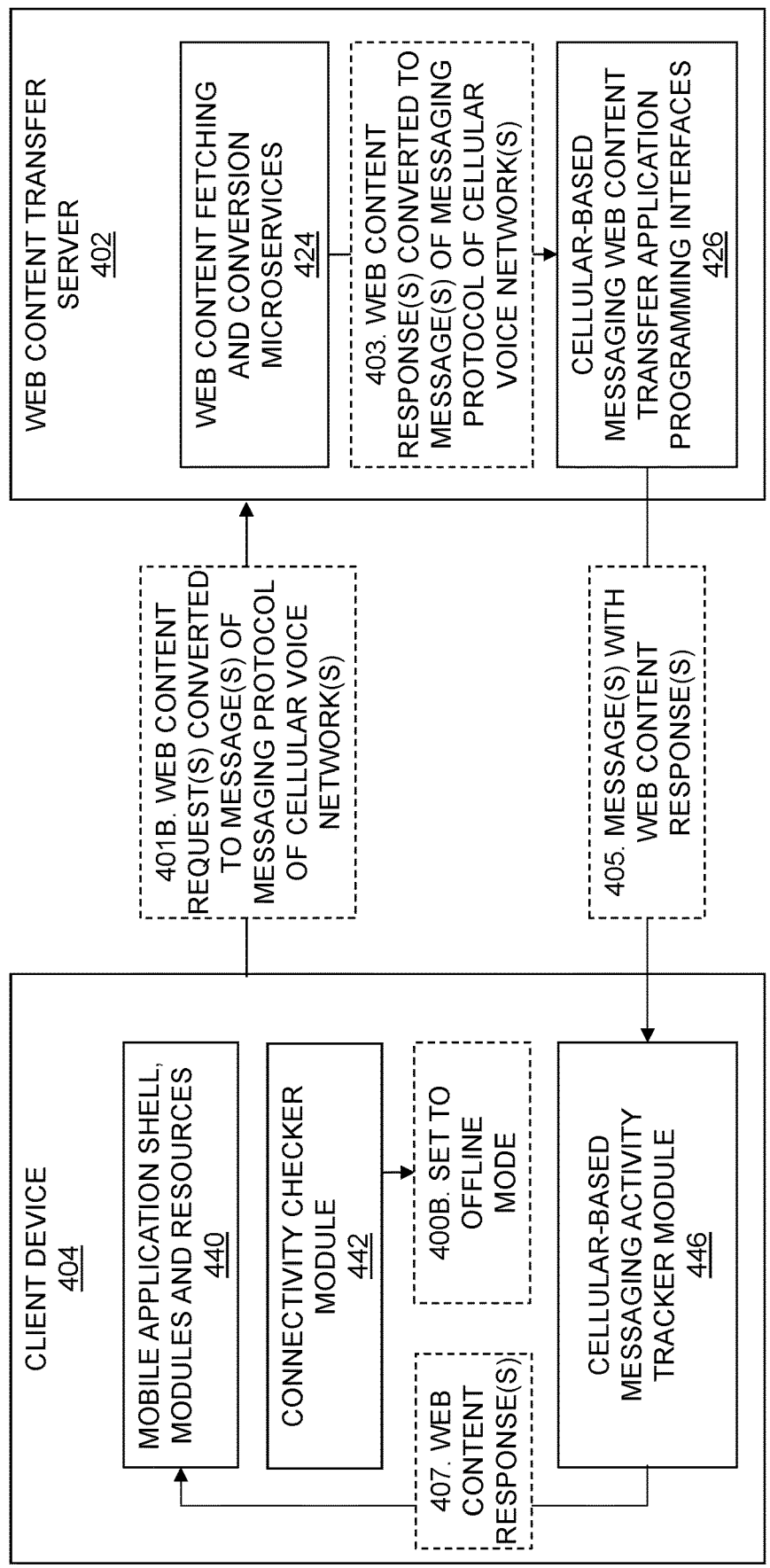

FIGS. 4A and 4B show a system flow for transferring web content utilizing messages of a messaging protocol of one or more cellular voice networks in a "low connectivity" and "offline" mode, respectively. Both FIGS. 4A and 4B show a web content transfer server 402 (e.g., an example of the web content transfer server 102 of FIG. 1) and a client device 404 (e.g., an example of the client device 104 of FIG. 1). The web content transfer server 402 implements a set of web content fetching and conversion microservices 424 and cellular-based messaging web content transfer APIs 426. The client device 404, which is assumed to comprise a smartphone or other mobile device, implements a mobile application shell, related modules and resources 440 (e.g., for one or more mobile applications, for an operating system of user interface of the client device 404, etc.) along with a connectivity checker module 442 and a cellular-based messaging activity tracker module 446.

The connectivity checker module 442 of the client device 404 is configured to monitor a level of connectivity of the client device 404 for one or more wireless data networks (e.g., continually or constantly, periodically, in response to mobile applications of the client device 404 initiating web content requests, etc.). Monitoring the level of connectivity using the connectivity checker module 442 may in some embodiments include continuously or periodically checking for changes in available wireless data networks, changes in detected or available network speeds of the wireless data networks, etc. If the level of connectivity is at or below a designated threshold level of connectivity, the connectivity checker module 442 raises or triggers an event that causes the client device 404 to enter the low connectivity mode or the offline mode.

The choice of whether to enter the low connectivity mode or offline mode may be based on the monitored level of connectivity. For example, if the connectivity checker module 442 determines that the level of connectivity is at or below the designated threshold level of connectivity (e.g., a first threshold level of connectivity) but is greater than another designated threshold level of connectivity (e.g., a second threshold level of connectivity), the connectivity checker module 442 may raise or trigger an event that causes the client device 404 to enter the low connectivity mode. If the connectivity checker module 442 determines that the level of connectivity is at or below the second threshold level of connectivity, the connectivity checker module 442 may raise or trigger an event that causes the client device 404 to enter the offline mode. In some embodiments, the low connectivity mode may be entered while there is at least some level of connectivity on the wireless data networks and the offline mode may be entered when there is no connectivity on the wireless data networks. In other embodiments, however, the connectivity checker module 442 may only use the offline mode, or may attempt to use the low connectivity mode before entering the offline mode.

FIG. 4A illustrates processing when the client device 404 enters the low connectivity mode in step 400A. In response to setting or entering the low connectivity mode in step 400A, the client device 404 may generate a notification to indicate to a user that the client device 404 is operating in the low connectivity mode. In some embodiments, the notification is displayed on a screen of the client device 404. In other embodiments, the notification may be an audible tone, haptic feedback or vibration of the client device 404, etc. The functionality for transferring web content utilizing messages of the messaging protocol of the cellular voice networks may, in some cases, be provided by a particular mobile application on the client device 404 and thus the notification may be displayed within that mobile application. In other embodiments, the functionality for transferring web content utilizing messages of the messaging protocol of the cellular voice networks may be provided by an operating system, user interface or service of the client device 404 (e.g., such functionality may be provided to multiple or all mobile applications and services of the client device 404 that rely on transferring web content or other data over the wireless data networks). In such cases, the notification may be presented in a notification bar, pop-up or other user interface feature of the client device 404 rather than being presented within one of the mobile applications.

After the client device 404 is set to low connectivity mode in step 400A, pages that the user visits in the mobile application are intelligently adapted for usage in the low connectivity mode. This may include, for example, causing web requests from the mobile application to utilize a different intelligent client (e.g., an API designed for web content data transfer over the messaging protocol of the one or more cellular voice networks) rather than a normal hypertext transfer protocol (HTTP) client that the mobile application would otherwise utilize to send the web requests to associated web servers. This intelligent client, in some embodiments, encrypts and compresses the web request packet size and sends the web requests with reduced payload over wireless data networks in step 401A to the web content transfer server 402. In some embodiments, Protocol Buffers (Protobuf) Serialization is used in conjunction with Prediction by partial matching (PPM) compression, or a variant thereof such as PPMd, in a file archiver (e.g., 7-Zip) to encrypt and send the web requests to the web content transfer server 402. In some cases, the use of Protobuf Serialization with PPMd compression achieves an over 80% reduction in payload content length. A receiver API of the cellular-based messaging web content transfer APIs 426 will decrypt, deserialize and decompress the web requests and orchestrate them to the relevant microservice of the web content fetching and conversion microservices 424.

The web content fetching and conversion microservices 424, after receiving the web requests from the receiver API of the cellular-based messaging web content transfer APIs 426, will process the web requests and fetch any web responses to be sent to the client device 404 from the web servers. In step 403, the web content fetching and conversion microservices 424 convert (e.g., serialize, encrypt and compress) the web responses to one or more messages of the messaging protocol of the one or more cellular voice networks. A sender API of the cellular-based messaging web content transfer APIs 426 will then send the messages (e.g., which may comprise programmable SMS messages) containing the serialized, encrypted and compressed web responses to the callee client device 404 in step 405.

The cellular-based messaging activity tracker module 446 of the client device 404, also referred to herein as an SMS tracker 446, senses the incoming messages of the messaging protocol of the one or more cellular voice networks that are from one or more source addresses corresponding to the web content transfer server 402. On detecting such messages, the cellular-based massing activity tracker module 446 will automatically prevent such messages from being displayed in messaging applications (e.g., an SMS application) of the client device 404 or in notifications (e.g., SMS notifications) of a user interface of the client device 404. In some embodiments, automatically preventing display of the messages from the source addresses associated with the web content transfer server 402 includes copying the content of the messages and then deleting the messages thus leaving behind no trace for the messaging related applications or user interface of the client device 404 to capture. The client device 404 will then deserialize, decrypt and decompress the messages to obtain the web content responses, which are provided to the mobile application shell 440 in step 407 to enable the mobile application to display and utilize real time data in the low connectivity mode.

FIG. 4B illustrates processing when the client device 404 enters the offline mode in step 400B. The processing in this case is substantially the same as the low connectivity mode, with the exception of sending the web content requests to the web content transfer server 402 in step 401B. Whereas in the low connectivity mode the client device 404 serializes, encrypts and compresses the web content requests to reduce the payload size sent over wireless data networks to the web content transfer server 402 in step 401A, in the offline mode the client device 404 serializes, encrypts and compresses the web content requests to reduce the payload size and converts the serialized, encrypted and compressed web content requests to one or more messages of the messaging protocol of the one or more cellular voice networks. Such messages are then provided to one or more designated destination addresses associated with the web content transfer server 402 in step 401B. The receiver API of the cellular-based messaging web content transfer APIs 426 receives and converts such messages back to the web content requests for transfer to the web servers using the web content fetching and conversion microservices 424. The processing then proceeds with steps 403, 405 and 407 as previously described in conjunction with the low connectivity mode.

While the above-described techniques for transferring web content utilizing messages of a messaging protocol of one or more cellular voice networks (e.g., using programmable SMS) are generally slower than transferring the web content over wireless data networks (e.g., 3G, 4G or 5G cellular data networks, WiFi networks, etc.), the above-described techniques advantageously ensure connectivity and coverage in areas where connectivity is poor or low (e.g., remote areas) which is needed for various use case scenarios, such as the above described example of a sales application utilized by sales representative to complete deals or other transactions.

Advantageously, some embodiments utilize a connectivity checker component (e.g., module 142/442) to continuously monitor connectivity levels so as to dynamically switch between low connectivity and offline modes (e.g., where web content is transferred utilizing a messaging protocol of one or more cellular voice networks) and an online mode (e.g., where web content is transferred utilizing one or more wireless data networks). Further, mobile applications are enabled to work efficiently and seamlessly when mobile devices are experiencing poor connectivity to provide real time data to users thereof anytime and anywhere that a cellular voice network connection is available. Some embodiments utilize an effective serialization technique (e.g., Protobuf) along with advanced text compression mechanisms customized for use with a messaging protocol of one or more cellular voice networks (e.g., programmable SMS) to significantly bring down request and response packet size as well.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for transferring web content utilizing a messaging protocol of one or more cellular voice networks will now be described in greater detail with reference to FIGS. 5 and 6. Although described in the context of system 100, these platforms may also be used to implement at least portions of other information processing systems in other embodiments.

Figure 5:
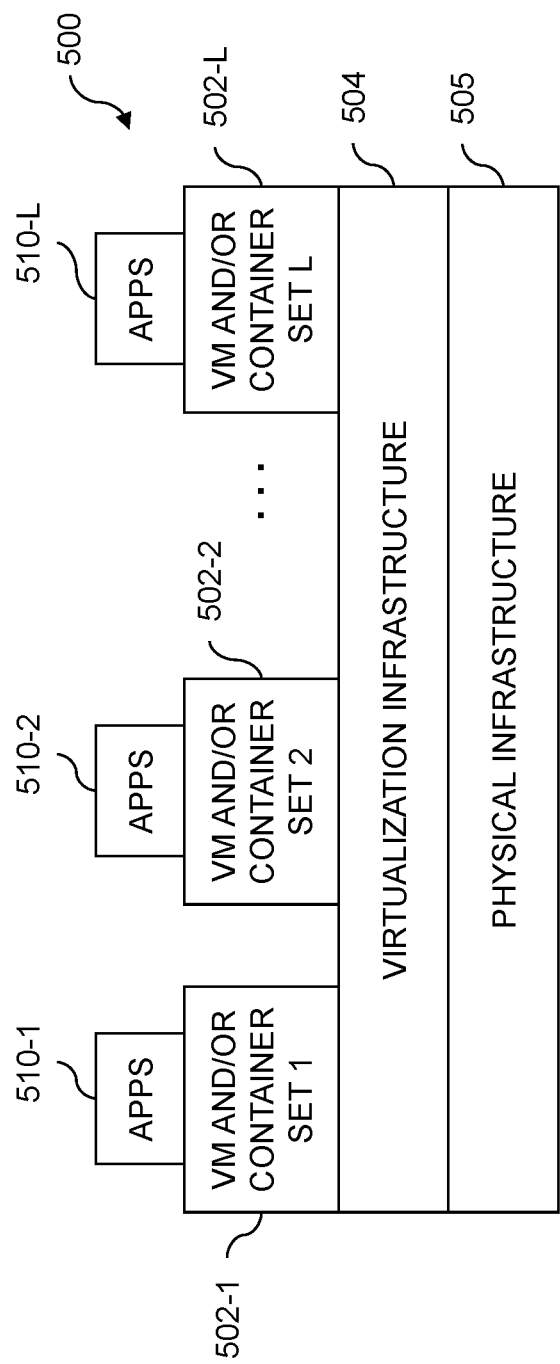
FIGS. 5 and 6 show examples of processing platforms that may be utilized to implement at least a portion of an information processing system in illustrative embodiments.
Figure 6:
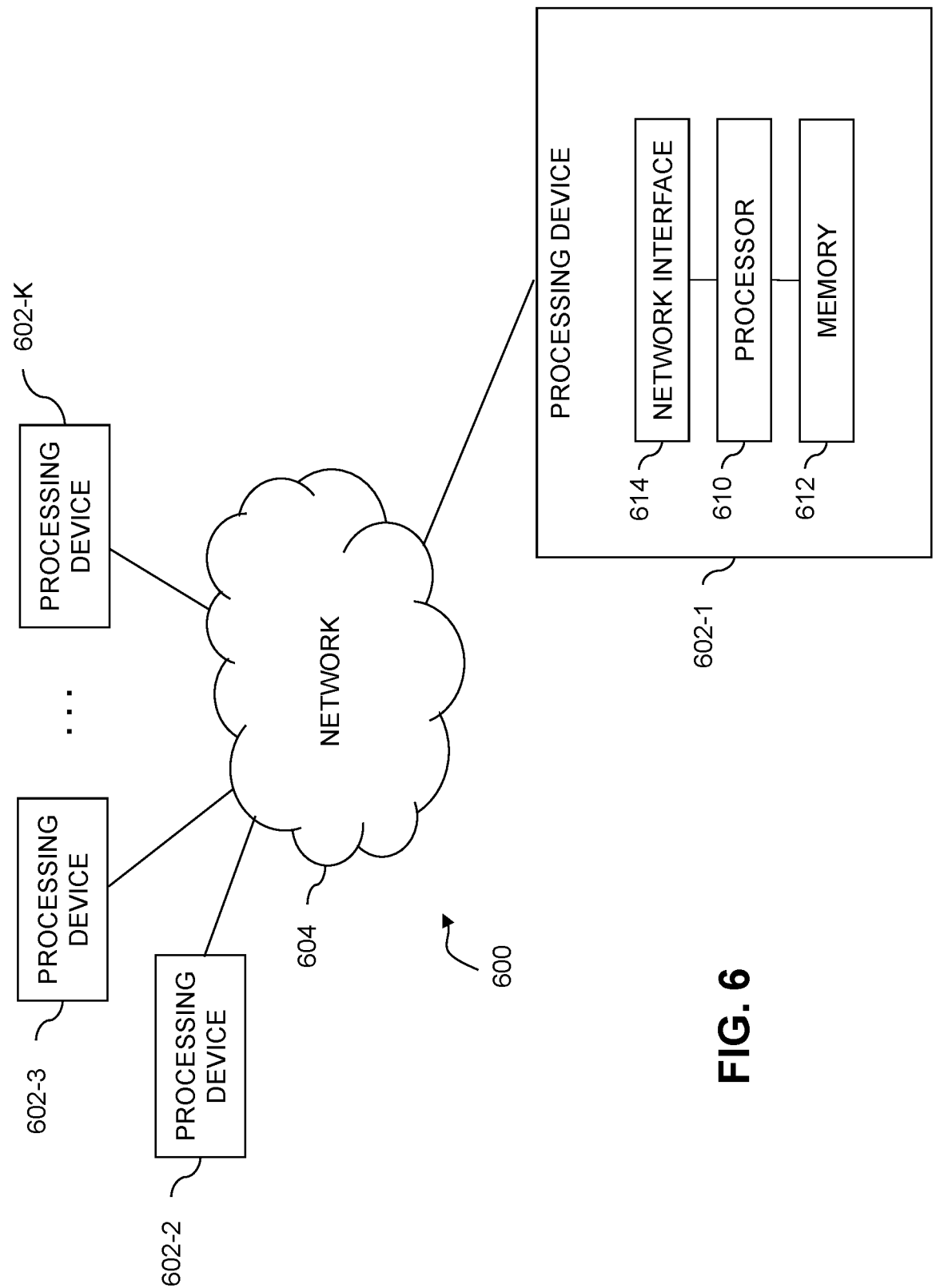

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for transferring web content utilizing a messaging protocol of one or more cellular voice networks as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, messaging protocols, mobile applications, encryption, serialization and compression algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      monitoring a level of connectivity, of the at least one processing device, for one or more wireless data networks;
      responsive to determining that the monitored level of connectivity is at or below a designated threshold level of connectivity, utilizing a messaging protocol of one or more cellular voice networks to transfer web content; and
      responsive to determining that the monitored level of connectivity is above the designated threshold level of connectivity, utilizing the one or more wireless data networks to transfer the web content;
   wherein utilizing the messaging protocol of the one or more cellular voice networks to transfer the web content comprises, for incoming web content:
      intercepting one or more incoming messages of the messaging protocol of the one or more cellular voice networks that have a source address corresponding to at least one of one or more designated addresses of a service for transferring the web content over the messaging protocol of the one or more cellular voice networks; and
      automatically preventing at least one of (i) display of the one or more incoming messages in one or more messaging applications running on the at least one processing device and (ii) display of notifications associated with the one or more incoming messages in a user interface running on the at least one processing device.

2. The apparatus of claim 1 wherein the one or more wireless data networks comprises at least one of a 3G cellular data network, a 4G cellular data network, a 5G cellular data network, and a WiFi data network.

3. The apparatus of claim 1 wherein the messaging protocol of the one or more cellular voice networks comprises a short message system (SMS) protocol.

4. The apparatus of claim 1 wherein the designated threshold level of connectivity corresponds to a designated available data transfer speed over the one or more wireless data networks.

5. The apparatus of claim 4 wherein the designated available data transfer speed comprises a data transfer speed associated with a 2G cellular data network.

6. The apparatus of claim 1 wherein utilizing the messaging protocol of the one or more cellular voice networks to transfer the web content further comprises, for the incoming web content:
   converting the one or more incoming messages to the incoming web content; and providing the incoming web content to one or more associated data applications running on the at least one processing device.

7. The apparatus of claim 6 wherein portions of the one or more incoming messages are at least one of encrypted, serialized and compressed, and wherein converting the one or more incoming messages to the incoming web content comprises at least one of decrypting portions of the one or more incoming messages that are encrypted, deserializing portions of the one or more incoming messages that are serialized, and decompressing portions of the one or more incoming messages that are compressed.

8. The apparatus of claim 1 wherein utilizing the messaging protocol of the one or more cellular voice networks to transfer the web content further comprises, for outgoing web content:
    intercepting one or more outgoing data requests associated with one or more data applications running on the at least one processing device;
    converting the one or more outgoing data requests to one or more outgoing messages of the messaging protocol of the one or more cellular voice networks; and
    providing the one or more outgoing messages to at least one of the one or more designated addresses corresponding to the service for transferring the web content over the messaging protocol of the one or more cellular voice networks.

9. The apparatus of claim 8 wherein converting the one or more outgoing data requests to the one or more outgoing messages of the messaging protocol of the one or more cellular voice networks comprises at least one of encrypting at least a portion of the one or more outgoing data requests, serializing at least a portion of the one or more outgoing data requests, and compressing at least a portion of the one or more outgoing data requests.

10. The apparatus of claim 1 wherein the at least one processing device is further configured to perform the steps of, responsive to determining that the monitored level of connectivity is at or below the designated threshold level of connectivity and greater than another designated threshold level of connectivity:
    utilizing the one or more wireless data networks to send outgoing web content from the at least one processing device; and
    utilizing the messaging protocol of the one or more cellular voice networks to receive the incoming web content at the at least one processing device.

11. The apparatus of claim 10 wherein sending the outgoing web content comprises reducing a payload content length of one or more outgoing data requests prior to sending the one or more outgoing data requests over the one or more wireless data networks.

12. The apparatus of claim 1 wherein the at least one processing device is further configured to perform the step of providing an indicator that web content is being transferred over the messaging protocol of the one or more cellular voice networks responsive to utilizing the messaging protocol of the one or more cellular voice networks to transfer the web content.

13. A method comprising steps of:
    monitoring a level of connectivity, of at least one processing device, for one or more wireless data networks;
    responsive to determining that the monitored level of connectivity is at or below a designated threshold level of connectivity, utilizing a messaging protocol of one or more cellular voice networks to transfer web content; and
    responsive to determining that the monitored level of connectivity is above the designated threshold level of connectivity, utilizing the one or more wireless data networks to transfer the web content;
    wherein utilizing the messaging protocol of the one or more cellular voice networks to transfer the web content comprises, for incoming web content:
        intercepting one or more incoming messages of the messaging protocol of the one or more cellular voice networks that have a source address corresponding to at least one of one or more designated addresses of a service for transferring the web content over the messaging protocol of the one or more cellular voice networks; and
        automatically preventing at least one of (i) display of the one or more incoming messages in one or more messaging applications running on the at least one processing device and (ii) display of notifications associated with the one or more incoming messages in a user interface running on the at least one processing device.

14. The method of claim 13 wherein utilizing the messaging protocol of the one or more cellular voice networks to transfer the web content further comprises, for the incoming web content:
    converting the one or more incoming messages to the incoming web content; and
    providing the incoming web content to associated data applications running on the at least one processing device.

15. A computer program product comprising a non-transitory processor-readable storage medium having stored therein program code of one or more software programs, wherein the program code when executed by the at least one processing device causes the at least one processing device to perform steps of the method of claim 13.

16. An apparatus comprising:
    at least one processing device comprising a processor coupled to a memory;
    the at least one processing device being configured to perform steps of:
        receiving, from one or more web servers, web content that is to be sent to a client device having a level of connectivity for one or more wireless data networks that is at or below a designated threshold level of connectivity;
        converting the web content to one or more messages of a messaging protocol of one or more cellular voice networks; and
        sending, to the client device, the one or more messages using the messaging protocol of the one or more cellular voice networks;
    wherein sending the one or more messages using the messaging protocol of the one or more cellular voice networks comprises sending the one or more messages to at least one of one or more designated addresses of a service for transferring the web content over the messaging protocol of the one or more cellular voice networks for interception at the client device prior to at least one of (i) display of the one or more messages in one or more messaging applications running on the client device and (ii) display of notifications associated with the one or more messages in a user interface running on the client device.

17. The apparatus of claim 16 wherein converting the web content to the one or more messages of the messaging protocol of the one or more cellular voice networks comprises at least one of encrypting, serializing and compressing the web content.

18. The apparatus of claim 16 wherein the at least one processing device is further configured to perform steps of:
   receiving, from the client device, one or more additional messages of the messaging protocol of the one or more cellular voice networks;
   converting the one or more additional messages of the messaging protocol of the one or more cellular voice networks to additional web content; and
   sending, to the one or more web servers, the additional web content.

19. The apparatus of claim 18 wherein receiving, from the client device, the one or more additional messages of the messaging protocol of the one or more cellular voice networks comprises intercepting messages provided to at least one of the one or more designated addresses corresponding to the service for transferring the web content over the messaging protocol of the one or more cellular voice networks.

20. The apparatus of claim 18 wherein converting the one or more additional messages of the messaging protocol of the one or more cellular voice network to the additional web content comprises at least one of decrypting at least a portion of the one or more additional messages, deserializing at least a portion of the one or more additional messages, and decompressing at least a portion of the one or more additional messages.

* * * * *